United States Patent [19]

Katsura et al.

[11] 4,310,578

[45] Jan. 12, 1982

[54] RETORT-STERILIZABLE LAMINATED STRUCTURE AND PROCESS FOR PREPARATION THEREOF

[75] Inventors: Tadahiko Katsura; Kenji Suzuki, both of Yokohama; Senji Ito, Ayase, all of Japan

[73] Assignee: Toyo Seikan Kaisha Limited, Tokyo, Japan

[21] Appl. No.: 55,004

[22] Filed: Jul. 5, 1979

[30] Foreign Application Priority Data

Jul. 5, 1978 [JP] Japan .................................. 53-80870
Sep. 11, 1978 [JP] Japan .................................. 53-110647
Oct. 26, 1978 [JP] Japan .................................. 53-131022

[51] Int. Cl.³ .................... B65D 00/00; B32B 15/08
[52] U.S. Cl. ........................................ 428/35; 156/334; 260/29.6 HN; 428/458; 428/461; 428/516; 428/349; 426/126
[58] Field of Search ................ 428/458, 461, 516, 35; 156/334; 260/29.6 HN

[56] References Cited

U.S. PATENT DOCUMENTS 4,031,062  6/1977  Shirayama ......................... 156/334
4,096,309  5/1978  Stillman ............................ 428/461

*Primary Examiner*—George F. Lesmes
*Assistant Examiner*—E. Rollins Buffalow
*Attorney, Agent, or Firm*—Sherman & Shalloway

[57] ABSTRACT

Disclosed is a retort-sterilizable laminated structure comprising an aluminum foil or sheet, a heat-sealable crystalline propylene type resin layer formed on one surface of the aluminum foil or sheet and a heat-resistant resin layer formed on the other surface of the aluminum foil or sheet, wherein the aluminum foil or sheet is heat-fusion-bonded to said crystalline propylene type resin layer through a layer of a modified olefin resin having a degree of crystallization of 15 to 95% and a carbonyl group concentration of 1 to 600 meq/100 g of the polymer, in which the majority of the structural olefin units are propylene units and the minority of the structural olefin units are ethylene units.

As the modified olefin polymer, a modified ethylene-propylene copolymer or a blend of a modified propylene type polymer with an ethylene type polymer is preferably employed.

10 Claims, 2 Drawing Figures

RETORT-STERILIZABLE LAMINATED STRUCTURE AND PROCESS FOR PREPARATION THEREOF

BACKGROUND OF THE INVENTION (1) Field of the Invention

The present invention relates to a retort-sterilizable laminated structure and a process for the preparation thereof. More particularly, the present invention relates to a retort-sterilizable sealing and packaging material excellent in the flavor retaining property and the interlaminar peel strength after retort sterilization.

Furthermore, the present invention relates to an improvement in the process for the preparation of laminated structures comprising heat-bonding an aluminum foil to a heat-sealable olefin resin layer through a modified olefin resin layer formed by melt extrusion.

(2) Description of the Prior Art

As a retort-sterilizable sealing and packaging material, there have heretofore been broadly used laminated sheets comprising an aluminum foil or sheet, a heat-sealable crystalline olefin resin layer formed on one surface of the aluminum foil or sheet and a heat-resistant resin layer, such as a polyethylene terephthalate layer, formed on the other surface of the aluminum foil or sheet. Such laminated sheet is piled and the periphery is heat-sealed to form a bag or pouch, and food or other content is packed in the bag or pouch and after degasification, the bag or pouch is sealed. Then, the sealed bag or pouch is heated and sterilized in a sterilizing apparatus called "retort" to obtain a packaged food or the like which can be preserved and stored under normal conditions.

A crystalline olefin resin used as a sealing material and an inner face material is ordinarily inactive, and a packaging material such as mentioned above is subjected to the heat-sterilizing treatment conducted under severe conditions. Accordingly, bonding of an aluminum foil or sheet to such olefin resin layer is mainly performed by using a thermosetting adhesive such as a urethane type adhesive (isocyanate type adhesive) or an epoxy type adhesive.

Such thermosetting adhesive is ordinarily satisfactory for attaining an object of providing a bonding excellent in the heat resistance and the resistance to hot water, but it is still insufficient in the property of retaining the flavor of packed food after retort sterilization.

A thermosetting resin is a complicated resinous composition comprising uncondensed monomers and polycondensates having a relatively low molecular weight. Furthermore, in the above-mentioned packaging material, the thermosetting adhesive layer is always present inside an impermeable metallic aluminum layer. Accordingly, when the packaging material is subjected to a severe treatment such as retort sterilization, the above-mentioned uncondensed monomers or oligomer tend to migrate in or react with the packed food. The above-mentioned thermosetting adhesive is ordinarily used in the form of a dilution with an organic solvent such as toluene, ethyl acetate or methylethyl ketone. Accordingly, when an aluminum foil is laminated on a crystalline olefin resin film by using such thermosetting adhesive, there should be adopted the steps of coating the adhesive on the aluminum foil, drying the coated aluminum foil by a hot air oven to evaporate the organic solvent and press-bonding the crystalline olefin resin film to the adhesive-coated aluminum foil to form a laminated structure. However, it is very difficult to remove the organic solvent completely by oven drying, and the residual organic solvent is caused to migrate into the packed food on retort sterilization and the flavor of the packed food is drastically degraded in some case. Thus, a packaging material composed of a laminated sheet comprising a crystalline olefin resin layer and an aluminum foil or sheet bonded thereto by a thermosetting adhesive is not satisfactorily in the property of retaining a packed food, though this packaging material is excellent in the food preserving property.

As the thermoplastic resin adhesive for heat-bonding a polyolefin layer to a metal substrate, there is known an olefin resin modified with an unsaturated carboxylic acid or the like. However, it has been found that when a modified propylene polymer is used for heat-bonding a crystalline propylene polymer to an aluminum foil or other metal substrate, various disadvantages are caused. For example, when an aluminum foil or the like is heat-bonded to a crystalline propylene polymer layer, it is necessary to apply a modified propylene resin between the two layers. However, modified propylene resins customarily used in this field are very brittle and it is very difficult to extrude them in the form of uniform and thin films. Therefore, in the conventional process for preparing laminated structures by using a modified propylene resin, there must be adopted complicated and troublesome steps of forming a dispersion of a modified propylene resin, coating the dispersion on an aluminum foil, removing the solvent by drying and heat-bonding the aluminum foil to a crystalline polypropylene layer.

Moreover, the heat-bondability of this modified propylene resin at a low temperature is very poor, and hence, the heat-bonding operation should be conducted at a high temperature. When a laminate is prepared at such high temperature, wrinkles are readily formed on the resulting laminate.

Furthermore, a laminated structure prepared according to the above procedures is defective in that when it is subjected to retort sterilization, interlaminar peeling is readily caused under shocks.

SUMMARY OF THE INVENTION

We made researches with a view to eliminating the foregoing defects involved in the conventional laminated structures. As a result, we found that a modified olefin resin having a degree of crystallization of 15 to 95% and a carbonyl group concentration of 1 to 600 meq/100 g of the polymer, in which the majority of the structural olefin units are propylene units and the minority of the structural olefin units are ethylene units, has an excellent extrudability and can be melt-extruded into a thin layer uniform in the thickness, and that when this modified propylene resin is used as an adhesive for production of a laminated structure such as mentioned above, the foregoing various defects involved in the conventional techniques can be effectively eliminated. We have now completed the present invention based on these findings.

It is therefore a primary object of the present invention to provide a laminated structure comprising an aluminum foil or the like and a crystalline propylene polymer layer bonded to the aluminum foil or the like through a thin adhesive layer of a thermoplastic polymer, and a process for the preparation of this laminated structure.

Another object of the present invention is to provide a laminated structure which is very valuable as a retort-sterilizable sealing and packaging material and is excellent in such properties as the flavor retaining property, the oil resistance, the shock resistance, the interlaminar peel strength and the mechanical strength.

Still another object of the present invention is to provide a process in which a laminated structure comprising an aluminum foil or the like and a crystalline polypropylene layer can be prepared by relatively simple operations economically advantageously.

In accordance with one fundamental aspect of the present invention, there is provided a retort-sterilizable laminated structure comprising an aluminum foil or sheet, a heat-sealable crystalline propylene type resin layer formed on one surface of the aluminum foil or sheet and a heat-resistant resin layer formed on the other surface of the aluminum foil or sheet, wherein said aluminum foil or sheet is heat-fusion-bonded to said crystalline propylene type resin layer through a layer of a modified olefin resin having a degree of crystallization of 15 to 95% and a carbonyl group concentration of 1 to 600 meq/100 g of the polymer, in which the majority of the structural olefin units are propylene units and the minority of the structural olefin units are ethylene units.

In accordance with another aspect of the present invention, there is provided a process for the preparation of laminated structures, which comprises applying a heat-sealable crystalline propylene type resin in the form of a layer to one surface of an aluminum foil or sheet and applying a heat-resistant resin in the form of a layer to the other surface of the aluminum foil or sheet, wherein a layer of a modified olefin resin formed by melt extrusion is interposed between said aluminum foil or sheet and the crystalline propylene type resin layer and said aluminum foil or sheet is heat-fusion-bonded to the crystalline propylene type resin layer through said modified olefin resin layer, said modified olefin having a degree of crystallization of 15 to 95% and a carbonyl group concentration of 1 to 600 meq/100 g of the polymer, and the majority of the structural olefin units of said modified olefin resin being propylene units and the minority of the structural olefin units being ethylene units.

DETAILED DESCRIPTION OF THE PREFERRED EMBODIMENTS

Figure 1:
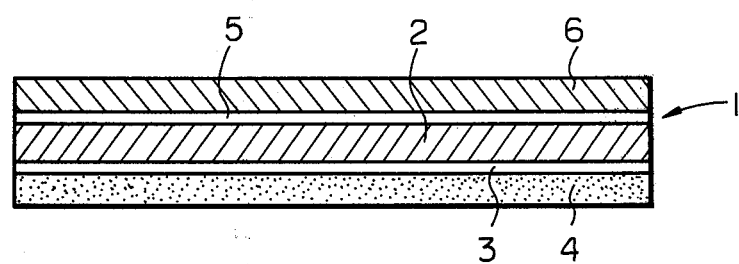
FIG. 1 is a sectional view illustrating one embodiment of the laminated structure of the present invention.

Referring to FIG. 1 illustrating the section of one embodiment of the laminated structure of the present invention, a sheet-like laminated structure 1 comprises an aluminum foil or sheet 2, a crystalline propylene type resin layer 4 bonded to one surface of the aluminum foil or sheet 2 through a layer 3 of a specific modified olefin resin and a heat-resistant resin layer 6 bonded to the other surface of the aluminum foil or sheet 2 through an adhesive layer 5.

Furthermore, a shock absorbing layer may be formed between the aluminum foil or sheet 2 and the heat-resistant resin layer 6 through an adhesive layer, if necessary. This shock absorbing layer may also be formed between the modified olefin resin layer 3 and the crystalline propylene type resin layer 4. In this case, another modified olefin resin layer should be disposed as an adhesive layer between the shock absorbing layer and the crystalline propylene type resin layer.

Figure 2:
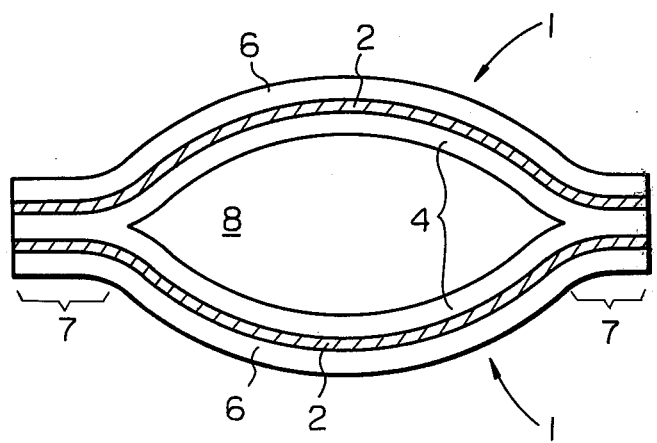
FIG. 2 is a sectional view illustrating one embodiment of the packaging material according to the present invention.

When a sealing and packaging material is prepared by using a laminated structure as shown in FIG. 1, two laminated sheets 1 are piled so that the crystalline propylene type resin layers 4 are located inside as shown in FIG. 2, and the periphery 7 of the piled assembly is heat-sealed to form a bag or pouch having in the interior a food-packing portion 8. For simplification, the modified resin layer 3 and the adhesive layer 5 are omitted in FIG. 2.

One of the important features of the present invention is that the crystalline propylene type resin layer 4 is laminated to the aluminum foil or sheet 1 through a layer 3 of a modified olefin resin having a degree of crystallization of 15 to 95%, preferably 40 to 80%, and a carbonyl group concentration of 1 to 600 meq (milliequivalents) per 100 g of the polymer, preferably 10 to 300 meq/100 g of the polymer, in which the majority (60 to 99 mole %) of the structural olefin units are propylene units and the minority (1 to 40 mole %) of the structural olefin units are ethylene units.

When the degree of crystallization of the modified olefin resin is lower than 15% or when the content of the propylene units in the modified olefin resin is too low, if the resulting packaging material is exposed to hot water or hot steam heated above 100° C. for retort sterilization, prominent interlaminar peeling is caused as shown in Comparative Example 5 given hereinafter. Furthermore, when the carbonyl group concentration in the modified olefin resin is lower than 1 meq/100 g of the polymer, prominent interlaminar peeling similarly takes place as shown in Comparative Example 1 given hereinafter. When the carbonyl group concentration is higher than 600 meq/100 g of the polymer, the flavor of the packed food is drastically degraded after retort sterilization because of the influences of substances which are considered to have been formed by retort sterilization (see Comparative Example 7 given hereinafter). Moreover, when the constituent olefin monomer of the modified olefin resin is different from that of the crystalline olefin resin, prominent interlaminar peeling is caused on retort sterilization.

In contrast, according to the present invention, by adjusting the degree of crystallization and the carbonyl group concentration in the modified olefin resin within the above-mentioned specific ranges, interlaminar bonding that can resist retort sterilization sufficiently can be obtained and when the resulting laminated structure is formed into a packaging material, the flavor retaining property after retort sterilization can be remarkably improved.

In the present invention, it is also important that the modified olefin resin should contain the propylene and ethylene units in the above-mentioned amounts as the structural olefin units. By virtue of this feature, a thin adhesive layer uniform in thickness can be formed by melt extrusion, heat bonding at a relatively low temperature becomes possible and the resistance to interlaminar peeling under shocks after retort sterilization can be remarkably improved.

For example, a modified propylene resin consisting solely of propylene units is brittle and extrusion of this modified resin is very difficult. Even if this modified resin is extruded, it is very difficult to obtain an adhesive layer having a thickness less than 30μ by extrusion.

Even if the melt index is arranged and the modified resin is melt-extruded in an adhesive layer having a thickness less than 30μ, the thickness unevenness is extreme and hence, it is very difficult to obtain a laminated structure having a satisfactory shape by using such adhesive layer. In contrast, the specific modified olefin resin that is used in the present invention has a highly improved extrudability and an adhesive layer having such a small thickness as 10 to 25μ and being uniform in thickness can be formed from this modified olefin resin by melt extrusion. Moreover, when this modified olefin resin is used for the production of a laminated structure, a highly improved low temperature bondability and a high resistance to interlaminar peeling under shocks after retort sterilization can be attained.

MODIFIED OLEFIN RESIN

In the modified olefin resin that is used in the present invention, the ethylene monomer units may be included in the form of a random or block copolymer with propylene or in the form of a polymer blend, or in combination thereof.

Ordinarily, a modified olefin resin may be prepared by incorporating a known carbonyl group-containing, ethylenically unsaturated monomer into a main chain or side chain of an olefin resin by known means such as graft copolymerization, block copolymerization, random polymerization or terminal treatment.

As the carbonyl group-containing ethylenically unsaturated monomer, there can be used monomers having a carbonyl group

derived from a carboxylic acid, a carboxylic acid salt, a carboxylic anhydride, a carboxylic acid ester, a carboxylic acid amide or imide, an aldehyde or a ketone singly or in combination with monomers having a cyano group (—CN), monomers having a hydroxyl group, monomers having an ether group or monomers having an oxirane ring

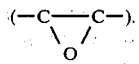

These carbonyl group-containing monomers may be used singly or in the form of a mixture of two or more of them. Suitable examples of monomers are as follows:
(A) Ethylenically unsaturated carboxylic acids such as acrylic acid, methacrylic acid, maleic acid, fumaric acid, crotonic acid, itaconic acid, citraconic acid and 5-norbornene-2,3-dicarboxylic acid.
(B) Ethylenically unsaturated carboxylic anhydrides such as maleic anhydride, citraconic anhydride, 5-norborne-2,3-dicarboxylic anhydride and tetrahydrophthalic anhydride.
(C) Ethylenically unsaturated esters such as ethyl acrylate, methyl methacrylate, 2-ethylhexyl acrylate monoethyl maleate, diethyl maleate, vinyl acetate, vinyl propionate, propyl γ-hydroxymethacrylate, ethyl β-hydroxyacrylate and glycidyl methacrylate.
(D) Ethylenically unsaturated amides and imides such as acrylamide, methacrylamide and maleimide.
(E) Ethylenically unsaturated aldehydes and ketones such as acrolein, methacrolein, vinylmethyl ketone and vinylbutyl ketone.

In the present invention, among the foregoing monomers, ethylenically unsaturated carboxylic acids and ethylenically unsaturated carboxylic anhydrides are especially preferred. These monomers are used singly or in combination with other monomers for modification of olefin resins.

Such carbonyl group-containing monomer is bonded to the main or side chain of an olefin resin so that the carbonyl group concentration is in the above-mentioned range and the degree of crystallization of the resulting modified olefin resin is at least 15%.

As the olefin resin that is modified with such monomer, that is, the trunk polymer, there can be mentioned, for example, a propylene homopolymer, an ethylene-propylene random copolymer and an ethylene-propylene block copolymer.

In order to modify an olefin resin so that the foregoing requirements are satisfied, for example, in case of the grafting treatment, it is necessary to select an olefin resin having a degree of crystallization of at least 15% as the starting olefin resin and conduct the grafting treatment under such conditions that the degree of crystallization of the olefin resin is not reduced below 15%. For this reason, high density polyethylene or isotactic polypropylene or a highly crystalline ethylene-propylene copolymer is preferably employed as the trunk polymer. Further, under such mild grafting conditions as will not cause any substantial reduction of the degree of crystallization, medium density polyethylene and low density polyethylene having a degree of crystallization higher than 15% can also be used.

In the instant specification and appended claims, by the term "degree of crystallization" is meant one determined according to the X-ray diffractiometry described in J. Polym. Sci., 18, pages 17–26, 1955 (S. L. Aggarwal and G. D. Tilley).

The grafting treatment can be conducted under known conditions so far as the above requirements are satisfied. For example, when a trunk polymer composed of an olefin resin is contacted with a carbonyl group-containing ethylenically unsaturated monomer in the presence of a radical initiator or under application of radical initiating means, a modified olefin resin can easily be obtained. The trunk polymer may be contacted with the monomer in a homogeneous solution system, a solid-liquid or solid-gas heterogeneous system or a homogeneous melt system. As the radical initiator, there can be mentioned, for example, organic peroxides such as dicumyl peroxide, t-butyl hydroperoxide, dibenzoyl peroxide and dilauroyl peroxide and azonitriles such as azobisisobutyronitrile and azobisisopropionitrile. These initiators are used in known catalytic amounts. As the radical initiating means, there can be mentioned, for example, ionizing radiations such as X-rays, γ-rays and electron rays, ultraviolet rays, combinations of ultraviolet rays with sensitizers, and mechanical radical initiating means such as kneading (mastication) and ultrasonic vibration.

In case of reaction of the homogeneous solution system, the olefin resin, monomer and initiator are dissolved in an aromatic solvent such as toluene, xylene or tetralin, and the grafting reaction is carried out. The resulting modified olefin is recovered as a precipitate. In case of reaction of the heterogeneous system, a powder of the olefin resin is contacted with the monomer or a dilution of the monomer under ionizing radiations to effect grafting. In case of reaction of the homogeneous melt system, a blend of the olefin resin and monomer optionally with the initiator is melt-extruded by an extruder or kneader to form a modified olefin resin. In each case, the resulting modified olefin resin may be subjected to a purifying treatment such as washing or extraction so as to remove the unreacted monomer, the homopolymer or the residual initiator. Further, when the resulting modified olefin resin is recrystallized from an aromatic solvent such as mentioned above and the crystallization conditions are appropriately controlled, the particle size can be adjusted.

A modified olefin resin that is used in the present invention can easily be prepared in the foregoing manner.

As another instance of the modified olefin resin, there can be mentioned an ionic polymer. This ionic polymer may be prepared by forming an acid-modified propylene type polymer according to the above-mentioned method and subjecting this acid-modified propylene type polymer to neutralization directly or after it has been homogeneously blended with an unmodified crystalline propylene type polymer for adjusting the carboxyl group concentration.

As the metal ion for neutralization of the acid, there can be conveniently used metals of the group I of the Periodic Table such as sodium and potassium, metals of the group II of the Periodic Table such as magnesium, calcium and zinc and metals of the group III of the Periodic Table such as aluminum. The concentration of such metal ion should be such that at least 10% of the acid included into the polymer is neutralized, and ordinarily, the metal ion is contained in such an amount as will neutralize 10 to 90% of the acid in the polymer.

Neutralization of the acid-modified propylene type polymer may be performed according to known means. For example, neutralization can easily be performed by contacting the acid modified polymer with an acetate, formate, hydroxide or carbonate of the above-mentioned metal in the solution state or molten state. Acid modification and neutralization may be conducted successively in the series of steps or simultaneously.

The molecular weight of the modified olefin resin is not particularly critical, so far as the resin has a film-forming molecular weight. Ordinarily, a modified olefin having a melt index of 1 to 40 g/10 min, particularly 2 to 30 g/10 min, is preferably used.

The above-mentioned modified olefin resins may be used singly or a blend of two or more of them may be used. Furthermore, a blend of such modified olefin resin with an unmodified olefin resin may be used. At any rate, it is sufficient if only the above-mentioned requirements of the degree of crystallization, the carbonyl group concentration and the proportions of units of olefinic monomers are satisfied in the modified resin or the modified resin blend.

In accordance with one preferred embodiment of the present invention, a modified resin formed by modifying an ethylene-propylene random or block copolymer containing 1 to 8 mole % of ethylene with an ethylenically unsaturated carboxylic acid or an anhydride thereof is used as the modified olefin resin.

In accordance with a most preferred embodiment of the present invention, the modified olefin resin is a blend comprising (A) a crystalline modified propylene type polymer having a carbonyl group concentration of 1 to 600 meq/100 g of the polymer, in which at least 80 mole % of the structural olefin units are propylene units, and (B) a modifier selected from the group consisting of (i) low density polyethylene having a density of 0.915 to 0.940 g/cc, (ii) a crystalline modified ethylene type polymer having a carbonyl group concentration of 1 to 600 meq/100 g of the polymer, in which at least 80 mole % of the structural olefin units are ethylene units, and (iii) a combination of at least one member selected from said low density polyethylene (i) and said crystalline modified ethylene type polymer (ii) with at least one member selected from an ethylene-propylene copolymer rubber in which 20 to 80 mole % of the structural units are propylene units and a modified ethylene-propylene copolymer rubber having a carbonyl group concentration of 1 to 600 meq/100 g of the polymer, the amount of said modifier (B) being 3 to 30 parts by weight per 100 parts by weight of said crystalline modified propylene type polymer (A).

As the polymer (A) that is used in this embodiment, there may be employed homopolypropylene. However, it is preferred to use a modified ethylene-propylene random or block copolymer such as mentioned above, or an ionic polymer comprising a polymer containing 0.2 to 20 mole % of at least one ethylenically unsaturated carboxylic acid and at least 80 mole % of propylene and a metal ion in an amount enough to neutralize at least a part of carboxyl groups of said polymer.

In the blend used in this embodiment, it is preferred that the melt index of said modified propylene type polymer (A) be 40 to 10 g/min, the melt index of said modifier (B) be 20 to 1 g/min, and the melt index of said polymer (A) be larger than the melt index of said modifier (B).

Incidentally, the melt index referred to in the instant specification and appended claims is one determined according to the method of ASTM D-1238.

The modified ethylene type polymer and modified ethylene-propylene copolymer rubber that are used in this invention may be prepared according to the same method as the method described above with respect to the modified propylene type polymer, except that a crystalline olefin resin in which at least 80 mole % of the structural olefin units are ethylene units and a rubbery polymer in which 20 to 80 mole % of the structural olefin units are propylene units and the remaining units are ethylene units or units of a mixture of ethylene with other α-olefin such as butene-1 or a conjugated or unconjugated diolefin such as butadiene, isoprene, 1,4-hexadiene or vinylnorbornene are used as the starting polymer to be modified, respectively.

ALUMINUM FOIL OR SHEET

When a flexible sealing or packaging material such as a bag container or pouch is prepared, an aluminum foil or sheet having a thickness of 6 to 80μ is ordinarily used. When a rigid or semi-rigid container such as a draw-formed container or press-formed vessel is prepared, an aluminum foil or sheet having a thickness of 9 to 500μ is ordinarily used. Either a surface-treated aluminum foil or sheet or a non-surface-treated aluminum foil or sheet can be used in the present invention. The surface treatment may be conducted according to a known method.

In order to attain the objects of the present invention effectively and advantageously, it is preferred to use an aluminum foil or sheet including an alumina hydrate layer having a thickness of 10 to 1000 mμ. If this aluminum foil or sheet is used, it is preferred that the modified olefin resin layer be disposed in the laminated structure so that the modified olefin resin layer is adjacent to the alumina hydrate layer.

CRYSTALLINE PROPYLENE TYPE POLYMER LAYER

As the crystalline propylene type polymer, there is employed a crystalline propylene type polymer which is heat-sealable and is capable of resisting retort sterilization. Isotactic polypropylene and a crystalline ethylene-propylene random or block copolymer having an ethylene content of 1 to 8 mole %, especially 3 to 6 mole %, are preferably employed. In order to improve the shock resistance and also improve the anti-blocking property in some case, it is possible to incorporate a small amount of an elastomer such as polyisobutylene, butyl rubber, styrene-butadiene rubber or ethylene-propylene rubber into the above-mentioned crystalline propylene type polymer.

PROTECTING COATING RESIN LAYER

For formation of the heat-resistant resin layer, there may be employed a thermoplastic resin having a higher melting or decomposition temperature than that of the above-mentioned crystalline propylene type polymer, or a thermosetting resin.

As the heat-resistant thermoplastic resin, there can be mentioned polyesters such as polyethylene terephthalate, polyamides such as nylon-6 and nylon-66, polycarbonates, cellulose esters and fluorine resins. As the thermosetting resin, there can be used heat-resistant polymers containing in the molecule chain a heterocyclic ring such as an imide ring, an imidazopyrrolone ring, an imidazole ring, an oxazole ring, an oxadiazole ring or a thiazole ring. There can be mentioned, for example, polyimides, polyamide-imides, polyester-imides, polyamide-imide esters, polyester amide-imides and polyimide-imidazopyrrolones. Furthermore, there may be employed epoxy-phenolic resin paints, phenolic resin paints, unsaturated polyester resin paints and oleoresinous paints.

The heat-resistant thermoplastic resin is easily available in the form of an unstretched or biaxially stretched film, and such film is laminated on the aluminum foil or sheet by using a known adhesive such as an epoxy type adhesive or a polyurethane type adhesive.

A layer of a heat-infusible heat-resistant resin may be formed by coating the aluminum foil or sheet with a solution of a prepolymer of such resin and baking the coated aluminum foil or sheet.

When a shock absorbing layer is formed outside the aluminum foil or sheet, a stretched or unstretched film of a polyamide, a copolyamide, a polycarbonate, a polyester-polyether or a polyester-polyactone, or a biaxially stretched polyester film may be used as the shock absorbing layer. When a shock absorbing layer is formed inside the aluminum foil or sheet, a polyamide or copolyamide having a bondability to the modified olefin resin can be used as the material of the shock absorbing layer.

LAMINATION

Lamination of the crystalline propylene type resin layer may be performed according to optional means, so far as the crystalline propylene type resin layer can be heat-fusion-bonded to the aluminum foil or sheet through the modified olefin resin layer formed by melt extrusion. For example, the crystalline propylene type resin layer is melt-extruded and coated on the modified olefin resin layer formed on the aluminum foil or sheet in advance by melt extrusion, or a film of the crystalline propylene type resin is press-bonded to such modified olefin resin layer. Furthermore, there may be adopted a method in which the modified olefin resin is melt-extruded between a preliminarily formed film of the crystalline propylene type resin and the aluminum foil or sheet and the assembly is pressed to form a laminated sheet. Moreover, there may be adopted a method in which the modified olefin resin layer and crystalline propylene type resin layer are formed by co-extrusion and the co-extrudate is fusion-bonded to the aluminum foil or sheet in such a positional relationship that the modified olefin resin layer is adjacent to the aluminum foil or sheet. Still further, there may be employed a method in which a laminate film including the modified olefin resin layer and the crystalline propylene type resin layer is formed by co-extrusion and the laminate film is heat-pressed to the aluminum foil or sheet in such a manner that the modified olefin resin layer confronts the aluminum foil or sheet.

When a sufficient bonding strength cannot be obtained by the above-mentioned lamination step, the bonding strength can be increased by heat-treating the laminated structure by using a heating roll, a post oven, a high frequency induction heater, an infrared heater or the like. Moreover, if necessary, a pouch or bag formed from the above laminated sheet is post-cured by using an oven, whereby the bonding strength can be increased.

In the present invention, a single layer of the modified olefin resin or a plurality of layers of the modified olefin resin may be formed. For example, it has been found that when a layer of a modified olefin resin having a relatively high carbonyl group concentration is formed on the side of the aluminum foil or sheet and a layer of a modified olefin resin having a relatively low carbonyl group concentration is formed on the side of the crystalline propylene type resin layer, the flavor retaining property and interlaminar peel strength after retort sterilization can be remarkably improved.

In accordance with still another embodiment of the present invention, the modified olefin resin layer has a double-layer structure including a highly modified olefin resin layer having a carbonyl group concentration of 100 to 600 meq/100 g of the polymer, which is located on the side adjacent to the aluminum foil or sheet, and a lowly modified olefin resin layer having a carbonyl group concentration of 1 to 200 meq/100 g of the polymer, which is located on the side adjacent to the crystalline propylene type resin layer. In this embodiment, the ratio of the thickness of the highly modified olefin resin layer (a) to the thickness of the lowly modified olefin resin layer (b) in the above-mentioned double-layer structure may be changed in the range of from 1/9 to 9/1.

In view of easiness in the heat sealing operation, it is preferred that the thickness of the crystalline propylene type resin layer be 10 to 300$\mu$, particularly 30 to 100$\mu$. In view of the bondability, it is preferred that the thickness of the modified olefin resin layer be 1 to 50$\mu$, particularly 5 to 20$\mu$.

A flexible vessel such as a pouch or bag may be prepared by piling two sheets of the so prepared laminated structure so that the crystalline propylene type resin layers of both the sheets are located on the inside and heat-sealing the three sides of the piled assembly while leaving a packing opening on one side. Heat sealing can easily be accomplished by using a heating bar, a heating knife, a heating wire, an impulse seal, an ultrasonic seal or an induction heating seal. Further, a rigid or semi-rigid vessel or container having a heat sealing flange may be obtained by draw-forming or press-forming the laminated sheet in such a manner that the crystalline propylene type resin layer is located on the inside.

A corruptible food, particularly a liquid food, is packed in the so prepared vessel or container and after gases injurious to preservation such as air are removed by vacuum degasification, hot filling, boiling degasification, steam injection or degasification by deformation of the vessel if necessary, the packing opening is sealed according to the above-mentioned heat sealing method. The packaged food is placed in a retorting apparatus and heat-sterilized at a temperature higher than 100° C.

When the retort-sterilizable sealing and packaging material of the present invention is employed, the flavor of the packed food is not degraded at all by heat sterilization, and the interlaminar peeling is not caused after sterilization or under falling shocks or the like. These are prominent advantages attained by the present invention.

The present invention will now be described in detail by reference to the following Examples that by no means limit the scope of the invention.

EXAMPLE 1

A biaxially stretched polyethylene terephthalate film having a thickness of 12μ was laminated on an aluminum foil having a thickness of 12μ by using a urethane type adhesive. An ethylene-propylene block copolymer having a melting point of 159° C., a density of 0.90 g/cm$^3$, a melt index of 7.0 g/10 min and an ethylene content of 4 mole % was melt-extruded through a single die by using an extruder provided with a screw having a diameter of 50 mm, and the extrudate was formed into a film having a thickness of 50μ according to the inflation method.

The laminated aluminum sheet was heated and maintained at 180° C. by a high frequency induction heating apparatus, and a blend comprising 60% by weight of a modified propylene copolymer having a carbonyl group concentration of 180 meq/100 g of the polymer, a degree of crystallization of 62%, a melting point of 153° C., a Vicat softening point of 140° C. and a melt index of 19.0 g/10 min, which was formed by grafting an ethylene-propylene block copolymer having an ethylene content of 5 mole % with maleic anhydride, 33% by weight of a modified propylene copolymer having a carbonyl group concentration of 180 meq/100 g of the polymer, a degree of crystallization of 52%, a melting point of 147° C., a Vicat softening point of 153° C. and a melt index of 20.0 g/10 min, which was formed by grafting an ethylene-propylene random copolymer having an ethylene content of 5 mole % with maleic anhydride, and 7% by weight of low density polyethylene having a melting point of 109° C., a density of 0.919 g/cm$^3$ and a melt index of 12.0 g/10 min was melt-extruded between the laminated aluminum sheet and the ethylene-propylene copolymer film through a T-die having a width of 650 mm by using an extruder provided with a screw having a diameter of 65 mm. At this melt extrusion step, the temperature of the resin at the die was 260° C. The assembly was press-bonded by a pair of press rolls maintained at 120° C. and 180° C., respectively, and having diameters of 400 mm and 200 mm, respectively. The press-bonded assembly was post-treated by a heating roll having a diameter of 400 mm, which was maintained at 220° C., and was then cooled to room temperature by using a cooling roll having a diameter of 200 mm. There was obtained a laminated sheet having a multi-layer laminate structure of 12μ polyethylene terephthalate layer/9μ aluminum foil/20μ modified propylene polymer blend layer/50μ propylene copolymer layer. When the peel strength between the aluminum foil and the propylene copolymer layer in this laminated sheet was measured, it was found that the peel strength was 910 g/1.5 cm.

A pouch as shown in Table 1 was prepared by using the so prepared laminated sheet and was subjected to the retorting test. Good results were obtained.

EXAMPLE 2

A biaxially stretched polyethylene terephthalate film having a thickness of 12μ was laminated on an aluminum foil having a thickness of 9μ by using a urethane type adhesive. An ethylene-propylene block copolymer having a melting point of 158° C., a density of 0.90 g/cm$^2$, a melt index of 8.0 g/10 min and an ethylene content of 5 mole % was melt-extruded through a single die by using an extruder provided with a screw having a diameter of 50 mm, and the extrudate was formed into a film having a thickness of 50μ according to the inflation method.

The laminated aluminum sheet was heated and maintained at 190° C. by an induction heating roll, and a blend comprising 85% by weight of a modified propylene copolymer having a carbonyl group concentration of 180 meq/100 g of the polymer, a degree of crystallization of 52%, a melting point of 147° C. and a melt index of 20.0 g/10 min, which was formed by grafting an ethylene-propylene random copolymer having an ethylene content of 5 mole % with maleic anhydride, 8% by weight of low density polyethylene having a melting point of 109° C., and density of 0.920 g/cm$^3$ and a melt index of 15.0 g/10 min and 7% by weight of an ethylene-propylene copolymer rubber having a propylene content of 35 mole % was melt-extruded between the laminated aluminum sheet and the propylene copolymer film through a T-die having a width of 650 mm by using an extruder provided with a screw having a diameter of 65 mm. At this melt extrusion step, the temperature of the resin at the die was 270° C. The formed assembly was press-bonded by a pair of press rolls maintained at 120° C. and 180° C., respectively, and having diameters of 400 mm and 200 mm, respectively. The pressed assembly was post-treated by a heating roll maintained at 220° C. and having a diameter of 400 mm and was then cooled to room temperature by a cooling roll having a diameter of 200 mm. There was obtained a laminate sheet having a multi-layer laminate structure of 12μ polyethylene terephthalate layer/9μ aluminum foil/20μ modified propylene copolymer blend layer/50μ propylene copolymer layer. When the peel strength between the aluminum foil and the propylene copolymer layer in the so prepared laminated sheet was measured, it was found that the peel strength was 890 g/1.5 cm.

A pouch as shown in Table 1 was prepared by using the so prepared laminated sheet and was subjected to the retorting test. Good results were obtained.

EXAMPLE 3

A biaxially stretched polyethylene terephthalate film having a thickness of 12μ was laminated on an aluminum foil having a thickness of 9μ by using a urethane type adhesive. An ethylene-propylene block copolymer having a melting point of 159° C., a density of 0.90 g/cm$^3$, a melt index of 7.0 g/10 min and an ethylene content of 4 mole % was melt-extruded through a single die by using an extruder provided with a screw having a diameter of 50 mm, and the extrudate was formed into a film having a thickness of 55μ according to the inflation method.

A blend comprising 100 parts by weight of a modified polymer blend having an average carbonyl group concentration of 280 meq/100 g of the polymer, which was formed by grafting a polymer blend comprising 95% by weight of an ethylene-propylene block copolymer having an ethylene content of 5 mole %, a melting point of 154° C. and a melt index of 14.0 g/10 min and 5% by weight of an ethylene-propylene copolymer rubber having a propylene content of 40 mole % with maleic anhydride, fumaric acid and acrylic acid, 7 parts by weight of an ethylene-acrylic acid copolymer having a density of 0.93 g/cm$^3$, a Vicat softening point of 82° C., a melt index of 9.0 g/10 min and an acrylic acid content of 8 mole % and 5 parts by weight of low density polyethylene having a density of 0.919 g/cm$^3$, a melting point of 109° C. and a melt index of 12.0 g/10 min was melt-extruded between the laminated aluminum sheet and the ethylene-propylene copolymer film through a T-die having a width of 650 mm by using an extruder provided with a screw having a diameter of 65 mm. At this melt extrusion step, the temperature of the resin at the die was 260° C. The assembly was press-bonded by a pair of press rolls maintained at room temperature and having diameters of 400 mm and 200 mm, respectively, to effect preliminary bonding. The press-bonded assembly was press-bonded by a heating roll having a diameter of 400 mm which was maintained at 200° C. and a press roll having a diameter of 100 mm, and was passed through an oven maintained at 230° C. and then cooled to room temperature by using a cooling roll having a diameter of 400 mm. There was obtained a laminated sheet having a multi-layer laminate structure of 12μ polyethylene terephthalate layer/9μ aluminum foil/15μ modified propylene polymer blend layer/55μ propylene copolymer layer. When the peel strength between the aluminum foil and the propylene copolymer layer in this laminated sheet was measured, it was found that the peel strength was 780 g/1.5 cm.

A pouch as shown in Table 1 was prepared by using the so prepared laminated sheet and was subjected to the retorting test. Good results were obtained.

EXAMPLE 4

A biaxially stretched polyethylene terephthalate film having a thickness of 12μ was laminated on an aluminum foil having a thickness of 9μ by using a urethane type adhesive. A blend comprising 92% by weight of an ethylene propylene block copolymer having a melting point of 159° C., a density of 0.90 g/cm$^2$, a melt index of 8.0 g/10 min and an ethylene content of 4 mole % and 8% by weight of an ethylene-propylene-diene terpolymer (EPDM) having an ethylene content of 62 mole %, a propylene content of 35 mole % and a 1,4-hexadiene content of 3 mole % was melt-extruded through a single die by using an extruder provided with a screw having a diameter of 50 mm, and the extrudate was formed into a film having a thickness of 50μ according to the inflation method.

The laminated aluminum sheet was heated and maintained at 190° C. by high frequency induction heating, and a modified blend having an average carbonyl group concentration of 410 meq/100 g of the polymer, which was formed by grafting a blend comprising 87% by weight of an ethylene-propylene block copolymer having an ethylene content of 5 mole %, a melting point of 154° C. and a melt index of 14.0 g/10 min, 8% by weight of low density polyethylene having a melting point of 109° C. and a melt index of 10.0 g/10 min and 5% by weight of an ethylene-propylene copolymer rubber having a propylene content of 35 mole % with maleic anhydride, by using a first extruder provided with a screw having a diameter of 50 mm, and a blend comprising 90% by weight of a modified propylene copolymer having a carbonyl group concentration of 80 meq/100 g of the polymer, a melting point of 153° C. and a melt index of 18.0 g/10 min, which was formed by grafting an ethylene-propylene block copolymer having an ethylene content of 4 mole % with maleic anhydride, 5% by weight of low density polyethylene having a melting point of 109° C., a density of 0.919 g/cm$^3$ and a melt index of 12.0 g/10 min and 5% by weight of an ethylene-propylene-diene terpolymer (EPDM) having an ethylene content of 62 mole %, a propylene content of 35 mole % and a 1,4-hexadiene content of 3 mole %, by using a second extruder provided with a screw having a diameter of 65 mm, were co-extruded between the laminated aluminum sheet and the propylene copolymer blend layer through a 2-ply T-die having a width of 650 mm and maintained at 250° C. The assembly was press-bonded by a pair of press rolls maintained at 120° C. and 180° C., respectively, and having diameters of 400 mm and 200 mm, respectively. The press-bonded assembly was post-treated by a heating roll having a diameter of 400 mm, which was maintained at 230° C., and was then cooled to room temperature by using a cooling roll having a diameter of 400 mm. There was obtained a laminated sheet having a multi-layer laminate structure of 12μ polyethylene terephthalate layer/9μ aluminum foil/5μ modified propylene copolymer blend layer/15μ modified propylene copolymer blend layer/50μ propylene copolymer blend layer. When the peel strength between the aluminum foil and the propylene copolymer blend layer in this laminated sheet was measured, it was found that the peel strength was 1200 g/1.5 cm.

A pouch as shown in Table 1 was prepared by using the so prepared laminated sheet and was subjected to the retorting test. Good results were obtained.

COMPARATIVE EXAMPLE 1

Procedures of Example 1 were repeated in the same manner except that a lowly modified propylene copolymer having a carbonyl group concentration of 0.4 meq/100 g of the polymer, which was formed by grafting an ethylenepropylene block copolymer having an ethylene content of 5 mole % with maleic anhydride, was used instead of the modified propylene copolymer used for the adhesive resin blend in Example 1. The interlaminar peel strength of the resulting laminated sheet was very low, and considerable interlaminar peeling was caused on the retorting treatment.

COMPARATIVE EXAMPLE 2

Procedures of Example 1 were repeated in the same manner except that a modified ethylene type polymer having a carbonyl group concentration of 200 meq/100 g of the polymer, which was formed by grafting an ethylene-propylene block copolymer having an ethylene content of 95 mole % and a propylene content of 5 mole % with maleic anhydride, was used instead of the modified propylene copolymer used for the adhesive resin blend in Example 1. The interlaminar peel strength between the modified ethylene type polymer blend layer and the propylene copolymers layer in the resulting laminated sheet was very low, and considerable interlaminar peeling was caused on the retorting treatment.

COMPARATIVE EXAMPLE 3

Procedures of Example 1 were repeated in the same manner except that a resin formed by modifying isotactic polypropylene was used instead of the modified propylene copolymer ternary blend used as the adhesive resin in Example 1. The thickness of the adhesive resin layer formed by extrusion lamination was not uniform and portions having a thickness exceeding 100μ appeared periodically. Further, no sufficient bonding strength was obtained under press bonding conditions adopted in Example 1. Considerable interlaminar peeling was caused on the retort-sterilization treatment.

COMPARATIVE EXAMPLE 4

Procedures of Example 1 were repeated in the same manner except that the composition of the modified propylene copolymer ternary blend used as the adhesive resin was changed so that the blend comprised 45% by weight of the modified ethylene-propylene copolymer, 20% by weight of the modified ethylene-propylene random copolymer and 35% by weight of the low density polyethylene. Considerable peeling was caused among the respective layers of the resulting laminated structure when it was subjected to the retort sterilization treatment.

COMPARATIVE EXAMPLE 5

Procedures of Example 1 were repeated in the same manner except that a modified propylene copolymer having a carbonyl group concentration of 150 meq/100 g of the polymer and a degree of crystallization lower than 10%, which was formed by grafting an ethylene-propylene copolymer having a propylene content of 35 mole % with maleic anhydride, was used instead of the modified propylene copolymer ternary blend used in Example 1. Considerable peeling was caused among the respective layers of the resulting laminated sheet when it was subjected to the retort sterilization treatment.

Accordingly, it was found that this laminated sheet was not suitable as a packaging material to be subjected to retort sterilization.

COMPARATIVE EXAMPLE 6

Procedures of Example 2 were repeated in the same manner except that the composition of the modified propylene copolymer ternary blend used as the adhesive resin was changed so that the blend comprised 65% by weight of the modified ethylene-propylene random copolymer, 15% by weight of the low density polyethylene and 20% by weight of the ethylene-propylene copolymer rubber. Considerable peeling was caused among the respective layers of the resulting laminated structure when it was subjected to the retort sterilization treatment.

COMPARATIVE EXAMPLE 7

Procedures of Example 2 were repeated in the same manner except that highly maleic acid-modified polypropylene having an average carbonyl concentration of 650 meq/100 g of the polymer was used instead of the modified propylene copolymer ternary blend used as the adhesive resin in Example 2. The flavor retaining property of a packaging vessel prepared by using the resulting laminated sheet was extremely poor after the retort sterilization treatment. Accordingly, it was found that the laminated sheet was not suitable as a packaging material to be subjected to the retort sterilization treatment.

Pouches were prepared by using the laminated sheets prepared in Examples 1 through 4 and foods shown in Table 1. Then, the retort sterilization treatment was carried out under conditions shown in Table 1. With respect to each of the filled and sterilized pouches, the interlaminar peel strength and flavor retaining property after the retort sterilization treatment were examined. Obtained results are shown in Table 1.

TABLE 1

| Example No. | Size of Pouch (mm × mm) | Packed Food Kind | Packed Food Amount (g) | Retort Sterilization Conditions Temperature (°C.) | Retort Sterilization Conditions Time (min.) | Retort Sterilization Conditions Pressure (Kg/cm$^2$) | Interlaminar Peel Strength (g/1.5cm) Before Retorting | Interlaminar Peel Strength (g/1.5cm) After Retorting | Flavor Retaining Property |
|---|---|---|---|---|---|---|---|---|---|
| 1 | 130 × 170 | corn cream soup | 200 | 135 | 10 | 2.1 | 910 | 920 | good |
| 2 | " | pilaf | 200 | 135 | 10 | 2.1 | 890 | 1010 | good |
| 3 | " | hamburger steak | 120 | 135 | 10 | 2.1 | 780 | 930 | good |
| 4 | " | chicken noodle soup | 200 | 135 | 10 | 2.1 | 1200 | 1340 | good |

EXAMPLE 5

A biaxially stretched polyethylene terephthalate film having a thickness of 12μ was laminated on an aluminum foil having a thickness of 9μ by using a urethane type adhesive. An ethylene-propylene copolymer having a melting point of 159° C., a density of 0.90 g/cm$^3$, a melt index of 7.0 g/10 min and an ethylene content of 4 mole % was melt-extruded through a single die by using an extruder provided with a screw having a diameter of 50 mm, and the extrudate was formed into a film having a thickness of 60μ according to the inflation method.

The laminated aluminum sheet was heated and maintained at 190° C. by a high frequency induction heating apparatus, and a blend comprising 50 parts by weight of an ionic propylene copolymer having a carbonyl group concentration of 250 meq/100 g of the polymer, a melting point of 152° C. and a melt index of 25.0 g/10 min, which was formed by grafting an ethylene-propylene block copolymer having an ethylene content of 5 mole % with acrylic acid and maleic acid and neutralized by Zn ions, and 50 parts by weight of a modified polymer blend having an average carbonyl group concentration of 280 meq/100 g of the polymer, which was formed by grafting a polymer blend comprising 76% by weight of an ethylene-propylene block copolymer having an ethylene content of 5 mole %, a melting point of 154° C. and a melt index of 14.0 g/10 min, 12% by weight of low density polyethylene having a melting point of 109° C. and a melt index of 14.0 g/10 min, 12% by weight of an ethylene-propylene copolymer rubber having a propylene content of 35 mole % with maleic anhydride was melt-extruded between the laminated aluminum sheet and the ethylene-propylene copolymer film through a T-die having a width of 650 mm by using an extruder provided with a screw having a diameter of 65 mm. At this melt extrusion step, the temperature of the resin at the die was 240° C. The assembly was press-bonded by a pair of press rolls maintained at 125° C. and 200° C., respectively, and having diameters of 400 mm and 200 mm, respectively. The press-bonded assembly was then cooled to room temperature by using a cooling roll having a diameter of 400 mm. There was obtained a laminated sheet having a multi-layer laminate structure of $12\mu$ polyethylene terephthalate layer/$9\mu$ aluminum foil/$15\mu$ ionic propylene polymer blend layer/$60\mu$ propylene copolymer layer.

The thickness of the ionic propylene polymer blend layer in the resulting laminated structure was uniform, and the extrudability of this adhesive resin blend layer was good. When the peel strength between the aluminum foil and the propylene copolymer layer was measured, it was found that the peel strength was 1240 g/1.5 cm.

Two strips having a size of 130 mm×170 mm were cut from the so obtained laminated sheet, and they were piled together so that the propylene copoymer layers of the respective strips were located on the inside. The three peripheral sides of the assembly were heat-bonded at a temperature of 270° C. under a pressure of 3 Kg/cm$^2$ for 1.0 second to form a pouch. Then, 180 g of curried hamburger was packed in the pouch and the filling opening was heat-sealed under the same conditions as described above. The filled pouch was subjected to the retort sterilization treatment at 135° C. for 10 minutes under a pressure of 2.1 Kg/cm$^2$. During this treatment, breakages of the pouch by peeling among the laminated layers or peeling of the sealed portions were not caused at all. After the retort sterilization treatment, the peel strength between the aluminum foil and the propylene copolymer layer was measured. It was found that the peel strength was 1080 g/1.5 cm. The taste of the sterilized curried hamburger was good, and the good flavor was sufficiently retained and was not substantially different from the flavor before the retort sterilization treatment.

EXAMPLE 6

A biaxially stretched polyethylene terephthalate film having a thickness of $12\mu$ was laminated on an aluminum foil having a thickness of $9\mu$ by using a urethane type adhesive.

A blend comprising 70% by weight of a modified propylene copolymer having a carbonyl group concentration of 250 meq/100 g of the polymer, a degree of crystallization of 56%, a melting point of 151° C., a Vical softening point of 140° C. and a melt index of 12.0 g/10 min, which was prepared by grafting an ethylene-propylene block copolymer having an ethylene content of 5 mole % with maleic anhydride, fumaric acid and vinyl acetate, 25% by weight of isotactic polypropylene having a density of 0.90 g/cm$^3$, a melting point of 152° C. and a melt index of 9.0 g/10 min and 5% by weight of low density polyethylene having a melting point of 109° C., a density of 0.919 g/cm$^3$ and a melt index of 12.0 g/10 min, by using a first extruder provided with a screw having a diameter of 50 mm, a blend comprising 20% by weight of the same modified propylene copolymer as described above, 70% by weight of the same isotactic polypropylene and 10% by weight of an ethylene-propylene-diene terpolymer (EPDE) having an average molecular weight of 100,000, an ethylene content of 62 mole %, a propylene content of 35 mole % and a 1,4-hexadiene content of 3 mole %, by using a second extruder provided with a screw having a diameter of 50 mm, and the same isotactic polypropylene as described above by using a third extruder provided with a screw having diameter of 65 mm, were co-extruded through a 3-ply T-die having a width of 650 mm and maintained at 220° C. The 3-layer co-extruded melt was press-bonded to the above aluminum laminated sheet by a pair of rolls having diameters of 400 mm and 200 mm, respectively, and maintained at room temperature to effect preliminary bonding. Then, the resulting laminated sheet was passed through a post oven maintained at 220° C. to complete bonding. The laminated sheet was cooled to room temperature by a cooling roll having a diameter of 400 mm. There was obtained a laminated sheet of a multi-layer laminate structure of $12\mu$ polyethylene terephthalate layer/$9\mu$ aluminum foil/$10\mu$ modified propylene copolymer ternary blend layer/$10\mu$ modified propylene copolymer ternary blend layer/$59\mu$ isotactic polypropylene layer. Peeling of the laminated sheet between the aluminum sheet and the polypropylene layer was very difficult.

Two strips having a size of 130 mm×170 mm were cut from the so obtained laminated sheet, and they were piled together so that the polypropylene layers of the respective strips were located on the inside. The three peripheral sides of the assembly were heat-bonded at a temperature of 270° C. under a pressure of 3 Kg/cm$^2$ for 1.0 second to form a pouch. Then, 180 g of consomme soup was packed in the pouch and the filling opening was heat-sealed under the same conditions as described above. The filled pouch was subjected to the retort sterilization treatment at 135° C. for 10 minutes under a pressure of 2.1 Kg/cm$^2$. During this treatment, breakages of the pouch by peeling among the laminated layers or peeling of the sealed portions were not caused at all. The taste of the sterilized consomme soup was good, and the good flavor was sufficiently retained.

EXAMPLE 7

A biaxially stretched polyethylene terephthalate film having a thickness of $12\mu$ and a biaxially stretched nylon-6 film having a thickness of $15\mu$ were laminated on an aluminum foil having a thickness of $9\mu$ by using a urethane type adhesive.

A blend comprising 60% by weight of a modified propylene copolymer having a carbonyl group concentration of 220 meq/100 g of the polymer, a degree of crystallization of 58%, a melting point of 156° C., a Vical softening point of 141° C. and a melt index of 6.0 g/10 min, which was prepared by grafting an ethylene-propylene block copolymer having an ethylene content of 5 mole % with maleic anhydride, fumaric acid and vinyl acetate and 40% by weight of an ethylene-propylene block copolymer having a density of 0.90 g/cm$^3$, a melting point of 158° C. and a melt index of 8.0 g/10 min, by using a first extruder provided with a screw having a diameter of 32 mm, and the same ethylene-propylene block copolymer as described above by using a second extruder provided with a screw having a diameter of 50 mm, were co-extruded through a 2-ply die. The co-extrudate was formed into a two-layer co-extruded film having a thickness of 70μ according to the inflation method. Then, the so obtained two-layer film was press-bonded to the above aluminum laminated sheet by a pair of rolls having diameters of 400 mm and 200 mm, respectively, and maintained at 180° C. to effect preliminary bonding. Then, the resulting laminated sheet was passed through a pair of rolls having diameters of 400 mm and 200 mm, respectively, and maintained at 220° C. to complete bonding. The laminated sheet was cooled to room temperature by a cooling roll having a diameter of 400 mm. There was obtained a laminated sheet of a multi-layer laminate structure of 12μ polyethylene terephthalate layer/15μ nylon-6 layer/9μ aluminum foil/10μ modified propylene copolymer layer/60μ propylene copolymer layer. When the peel strength between the aluminum foil and the propylene copolymer layer in the resulting laminated sheet was measured, it was found that the peel strength was 960 g/cm$^2$.

Two strips having a size of 130 mm×170 mm were cut from the so obtained laminated sheet, and they were piled together so that the propylene copolymer layers of the respective strips were located on the inside. The three peripheral sides of the assembly were heat-bonded at a temperature of 270° C. under a pressure of 3 Kg/cm$^2$ for 1.0 second to form a pouch. Then, 200 g of shrimp gratin was packed in the pouch and the filling opening was heat-sealed under the same conditions as described above. The filled pouch was subjected to the retort sterilization treatment at 135° C. for 10 minutes under a pressure of 2.1 Kg/cm$^2$. During this treatment, breakages of the pouch by peeling among the laminated layers or peeling of the sealed portions were not caused at all. The taste of the sterilized shrimp gratin was good, and the good flavor was sufficiently retained and was not substantially different from the flavor before the retort sterilization treatment.

EXAMPLE 8

A blend comprising 70% by weight of a modified propylene copolymer having a carbonyl group concentration of 180 meq/100 g of the polymer, a degree of crystallization of 49%, a melting point of 145° C., a Vical softening point of 134° C. and a melt index of 13.0 /10 min, which was prepared by grafting an ethylene-propylene block copolymer having an ethylene content of 4 mole % with maleic anhydride and maleic acid at a molar ratio of 3/1 and 30% by weight of isotactic polypropylene having a density of 0.91 g/cm$^3$, a melting point of 162° C. and a melt index of 12.0 g/10 min, by using a first extruder provided with a screw having a diameter of 50 mm, and an ethylenepropylene block copolymer having a density of 0.90 g/cm$^3$, a melting point of 154° C., a melt index of 10.0 g/min and an ethylene content of 5 mole %, by using a second extruder provided with a screw having a diameter of 65 mm, were co-extruded through a 2-ply T-die having a width of 650 mm and maintained at 220° C. The so-extruded 2-layer melt was press-bonded to an aluminum sheet having a thickness of 100μ, which was heated and maintained at 220° C. by an oven and a high frequency induction heating apparatus and had an epoxy resin protecting coating film formed on one surface thereof, by means of a pair of press rolls having diameters of 400 mm and 200 mm, respectively, and maintained at 100° C. to effect preliminary bonding. Then, the laminated sheet was passed through an oven maintained at 220° C. to complete bonding. Then, the laminated sheet was cooled to room temperature by a cooling roll having a diameter of 400 mm. There was obtained a laminated sheet having a multi-layer laminate structure of epoxy resin protecting film/100μ aluminum sheet/15μ modified propylene copolymer blend layer/50μ propylene copolymer layer. In this laminated sheet, the peel strength between the aluminum sheet and the propylene copolymer layer was found to be 1510 g/1.5 cm.

The so obtained laminated sheet was subjected to cold forming processing to obtain a vessel including smooth side walls and a horizontal flange portion and having a height of 20 mm and an inner capacity of 350 cc. Meat source was packed in the vessel and a lid composed of the same laminated sheet was heat-sealed to the vessel. The filled vessel was subjected to the retort sterilization treatment at 120° C. for 40 minutes. During this treatment, peeling of the laminted layers or sealed portions was not caused at all. The taste of the sterilized meat souse was good, and the flavor was sufficiently retained.

EXAMPLE 9

A biaxially stretched polyethylene terephthalate film having a thickness of 12μ was laminated on an aluminum foil having a thickness of 9μ by using a urethane type adhesive.

A blend comprising 94% by weight of a modified propylene copolymer having a carbonyl group concentration of 160 meq/100 g of the polymer, a degree of crystallization of 63%, a melting point of 154° C., a Vical softening point of 141° C. and a melt index of 21.0 g/10 min, which was prepared by grafting an ethylene-propylene block copolymer having an ethylene content of 3 mole % with maleic anhydride and 6% by weight of modified low density polyethylene having a carbonyl group concentration of 200 meq/100 g of the polymer, a density of 0.921 g/cm$^3$ and a melt index of 9.0 g/10 min, which was prepared by grafting low density polyethylene with maleic anhydride, was extruded through a T-die having a width of 650 mm through a first extruder provided with a screw having a diameter of 65 mm. The temperature of the resin in the die portion was maintained at 250° C. The co-extrudate was press-bonded to the aluminum laminated sheet by a pair of rolls having diameters of 400 mm and 200 mm, respectively, and maintained at 50° C. Then, the modified propylene copolymer blend layer was fusion-bonded to the aluminum foil by a high frequency induction heating apparatus.

A blend comprising 90% by weight of an ethylene-propylene block copolymer having a melting point of 159° C., a density of 0.90 g/cm$^3$, a melt index of 12.0 g/10 min and an ethylene content of 4 mole %, 5% by weight of low density polyethylene having a melting point of 109° C., a density of 0.920 g/cm$^3$ and a melt index of 9.0 g/10 min and 5% by weight of an ethylenepropylene copolymer rubber having a propylene content of 35 mole % was extruded through a T-die having a width of 650 mm by using a second extruder provided with a screw having a diameter of 65 mm. The temperature of the resin in the die portion was maintained at 270° C. The extrudate was press-bonded to the above-mentioned laminated aluminum sheet coated with the modified propylene copolymer blend by means of a pair of rolls having diameters of 400 mm and 200 mm, respectively, and maintained at 50° C. There was obtained a laminated sheet having a multi-layer laminate structure of 12μ polyethylene terephthalate layer/9μ aluminum foil/30μ modified propylene copolymer binary blend layer/40μ propylene copolymer ternary blend layer.

When the peel strength between the aluminum foil and the propylene copolymer blend layer was measured, it was found that the peel strength was 1120 g/1.5 cm.

Two strips having a size of 130 mm×170 mm were cut from the so obtained laminate sheet, and they were piled together so that the propylene copolymer blend layers of the respective strips were located on the inside. The three peripheral sides of the assembly were heat-bonded at a temperature of 270° C. under a pressure of 3 Kg/cm² for 1.0 second to form a pouch. Then, 190 g of beef stew was packed in the pouch and the filling opening was heat-sealed under the same conditions as described above. The filled pouch was subjected to the retort sterilization treatment at 135° C. for 10 minutes under a pressure of 2.1 Kg/cm². During this treatment, breakages of the pouch by peeling among the laminated layers or peeling of the sealed portions were not caused at all.

The taste of the sterilized beef stew was good, and the good flavor was sufficiently retained and was not substantially different from the flavor before the retort sterilization treatment.

A pouch was similarly prepared by using the above-mentioned laminated sheet, and 180 cc of distilled water was packed in the pouch and the pouch was sealed in the same manner as described above.

By using the above-mentioned polyethylene terephthalate film, the above-mentioned aluminum foil, a 70μ-thick film composed of the above-mentioned ethylene-propylene copolymer and a urethane type adhesive, a laminated sheet was prepared. A pouch was similarly prepared from this laminated sheet, and 180 cc of distilled water was packed in the pouch and the pouch was heat-sealed.

Further, a glass ampoule filled with distilled water was prepared as a control.

The two water-filled pouches and the glass ampoule were subjected to the retort sterilization treatment under the same conditions as described above.

The organoleptic test was carried out on so retort-sterilized water by a panel consisting of 25 men. Obtained results are shown in Table 2.

TABLE 2

| | Number of Men Answering That Water of Control Is Better (n = 25) | |
|---|---|---|
| | Taste | Smell |
| Product of Present Invention | 8 | 3 |
| Product Formed by Using Urethane Type Adhesive | 17 | 22 |

TABLE 2-continued

| | Number of Men Answering That Water of Control Is Better (n = 25) | |
|---|---|---|
| | Taste | Smell |
| Adhesive | | |

From the results shown in Table 2, it will readily be understood that the product of the present invention is excellent.

What is claimed is:

1. A retort-sterilizable laminated structure comprising an aluminum foil or sheet, a heat-sealable crystalline propylene type resin layer formed on one surface of the aluminum foil or sheet and a heat-resistant resin layer formed on the other surface of the aluminum foil or sheet, wherein said aluminum foil or sheet is heat-fusion-bonded to said crystalline propylene type resin layer through a layer of a modified olefin resin, and wherein said modified olefin resin is a blend comprising (A) a crystalline modified propylene type polymer having a carbonyl group concentration of 1 to 600 meq/100 g of the polymer, in which at least 80 mole % of the structural olefin units are propylene units, and (B) a modifier selected from the group consisting of (i) low density polyethylene having a density of 0.915 to 0.940 g/cc, (ii) a crystalline modified ethylene type polymer having a carbonyl group concentration of 1 to 600 meq/100 g of the polymer, in which at least 80 mole % of the structural olefin units are ethylene units, and (iii) a combination of at least one member selected from said low density polyethylene (i) and said crystalline modified ethylene type polymer (ii) with at least one member selected from an ethylene-propylene copolymer rubber in which 20 to 80 mole % of the structural units are propylene units and a modified ethylene-propylene copolymer rubber having a carbonyl group concentration of 1 to 600 meq/100 g of the polymer, the amount of said modifier (B) having 3 to 30 parts by weight per 100 parts by weight of said crystalline modified propylene type polymer (A).

2. A laminated structure as set forth in claim 1 wherein the modified propylene type polymer is a modified resin formed by modifying an ethylene-propylene random or block copolymer containing 1 to 8 mole % of ethylene with an ethylenically unsaturated carboxylic acid or an anhydride thereof.

3. A laminated structure as set forth in claim 1 wherein said modified propylene type polymer (A) is an ionic polymer comprising a polymer containing 0.2 to 20 mole % of at least one ethylenically unsaturated carboxylic acid and at least 80 mole % of propylene and a metal ion in an amount enough to neutralize at least a part of carboxyl groups of said polymer.

4. A laminated structure as set forth in claim 1 wherein the melt index of said modified propylene type polymer (A) is 40 to 10 g/min, the melt index of said modifier (B) is 20 to 1 g/min, and the melt index of said polymer (A) is larger than the melt index of said modifier (B).

5. A laminated structure as set forth in claim 1 wherein said crystalline propylene type resin layer is a film of isotactic polypropylene.

6. A laminate structure as set forth in claim 1 wherein said crystalline propylene type resin layer is an ethylene-propylene block copolymer having an ethylene content of 1 to 8 mole %.

7. A retort-sterilizable sealing and packaging material comprising a laminated structure as set forth in claim 1.

8. A retort-sterilizable sealing and packaging material comprising two sheets of a laminated structure as set forth in claim 1, which are piled so that the heat-sealable crystalline propylene type resin layers of two sheets are located on the inside, to form a bag-like or pouch-like vessel, the periphery of said vessel being heat-sealed.

9. A process for the preparation of laminated structures, which comprises applying a heat-sealable crystalline propylene type resin in the form of a layer to one surface of an aluminum foil or sheet and applying a heat-resistant resin in the form of a layer to the other surface of the aluminum foil or sheet, wherein a layer of a modified olefin resin formed by melt extrusion is interposed between said aluminum foil or sheet and the crystalline propylene type resin layer and said aluminum foil or sheet is heat-fusion-bonded to the crystalline propylene type resin layer through said modified olefin resin layer and wherein said modified olefin resin is a blend comprising (A) a crystalline modified propylene type polymer having a carbonyl group concentration of 1 to 600 meq/100 g of the polymer, in which at least 80 mole % of the structural olefin units are propylene units, and (B) a modifier selected from the group consisting of (i) low density polyethylene having a density of 0.915 to 0.940 g/cc, (ii) a crystalline modified ethylene type polymer having a carbonyl group concentration of 1 to 600 meq/100 g of the polymer, in which at least 80 mole % of the structural olefin units are ethylene units, and (iii) a combination of at least one member selected from said low density polyethylene (i) and said crystalline modified ethylene type polymer (ii) with at least one member selected from an ethylene-propylene copolymer rubber in which 20 to 80 mole % of the structural units are propylene units and a modified ethylene-propylene copolymer rubber having a carbonyl group concentration of 1 to 600 meq/100 g of the polymer, the amount of said modifier (B) being 3 to 30 parts by weight per 100 parts by weight of said crystalline modified propylene type polymer (A).

10. A process according to claim 9 wherein the modified propylene type polymer is a modified resin formed by modifying an ethylene-propylene random or block copolymer containing 1 to 8 mole % of ethylene with an ethylenically carboxylic acid or an anhydride thereof.

* * * * *